United States Patent [19]
Stephenson et al.

[11] Patent Number: 5,136,844
[45] Date of Patent: Aug. 11, 1992

[54] CONTROLLER WITH REDUCED TRAVEL LIMIT SLIP

[75] Inventors: Dwight B. Stephenson, Savage; Bernard J. Larson, New Hope, both of Minn.

[73] Assignee: Eaton Corportaion, Cleveland, Ohio

[21] Appl. No.: 595,526

[22] Filed: Oct. 11, 1990

[51] Int. Cl.$^5$ .................... F16D 31/02; F15B 9/10
[52] U.S. Cl. .................... 60/384; 91/375 R; 180/141
[58] Field of Search .................... 60/384, 385; 91/370, 91/374, 375 R, 467, 434; 180/141

[56] References Cited

U.S. PATENT DOCUMENTS

| | | | |
|---|---|---|---|
| 3,801,239 | 4/1974 | Larson | 60/384 |
| 3,880,554 | 4/1975 | Termansen et al. | 418/104 |
| 4,096,883 | 6/1978 | Yip | 60/384 |
| 4,558,720 | 12/1985 | Larson et al. | 60/384 |
| 4,804,016 | 2/1989 | Novacek et al. | 60/384 |
| 4,958,493 | 9/1990 | Schutten et al. | 60/384 |
| 5,016,672 | 5/1991 | Stephenson | 91/467 |

Primary Examiner—Edward K. Look
Assistant Examiner—Hoang Nguyen
Attorney, Agent, or Firm—L. J. Kasper

[57] ABSTRACT

A controller (15) is provided of the type which may be utilized in a hydrostatic power steering system. The controller includes a fluid actuated displacement mechanism (21) comprising a stationary ring (47) and a moveable star (49) to meter fluid flow through the controller valving (19). A plug member (105) is operable to apply a braking force to the moveable member (49) and it cooperates with the housing (27) to define a fluid chamber (109). The housing defines a fluid passage (111, 113, 117, 119) between the fluid chamber and the controller valving (19). The controller valving in the housing defines a drain passage (95, 99, 97) to drain the fluid chamber (109) when the controller valving is in its first operating position (FIG. 4) and to restrict the drain and allow pressure to increase in the fluid chamber (109) when the valving is approaching its maximum displacement position (FIG. 5). As a result, travel limit slip is substantially reduced by applying a braking force to the star, but only when the valving is approaching its maximum displacement position, thus avoiding the problem of feed-through.

13 Claims, 5 Drawing Sheets

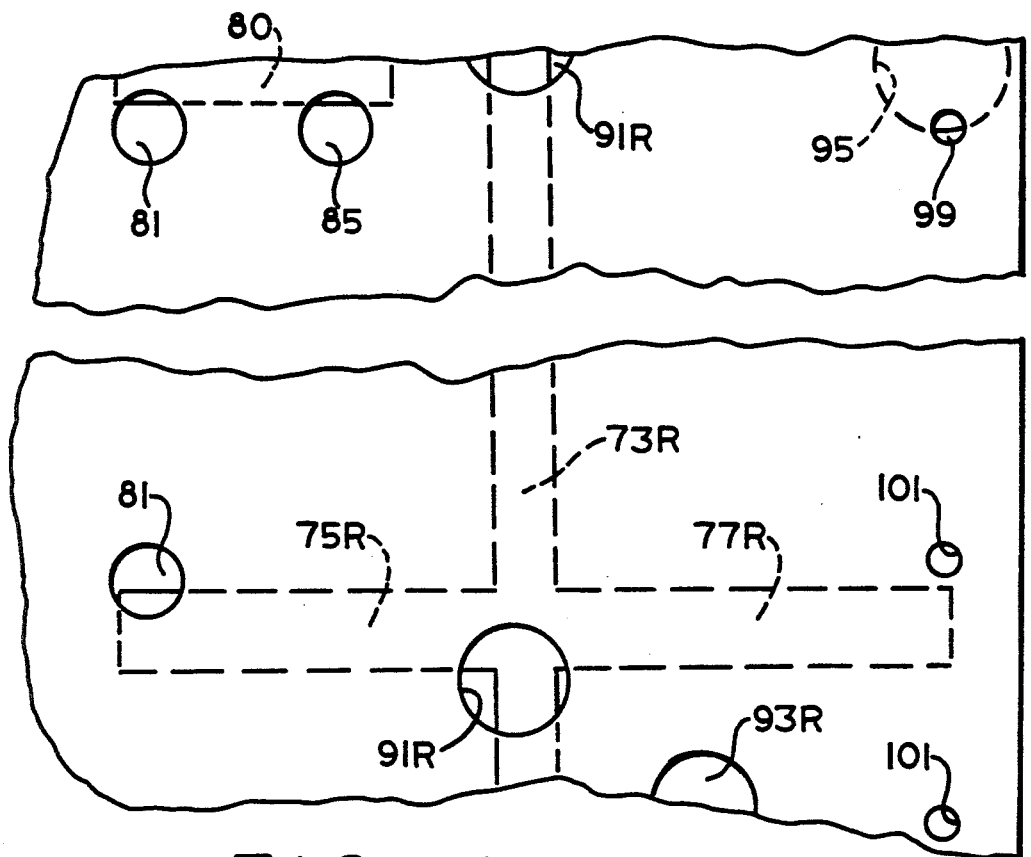
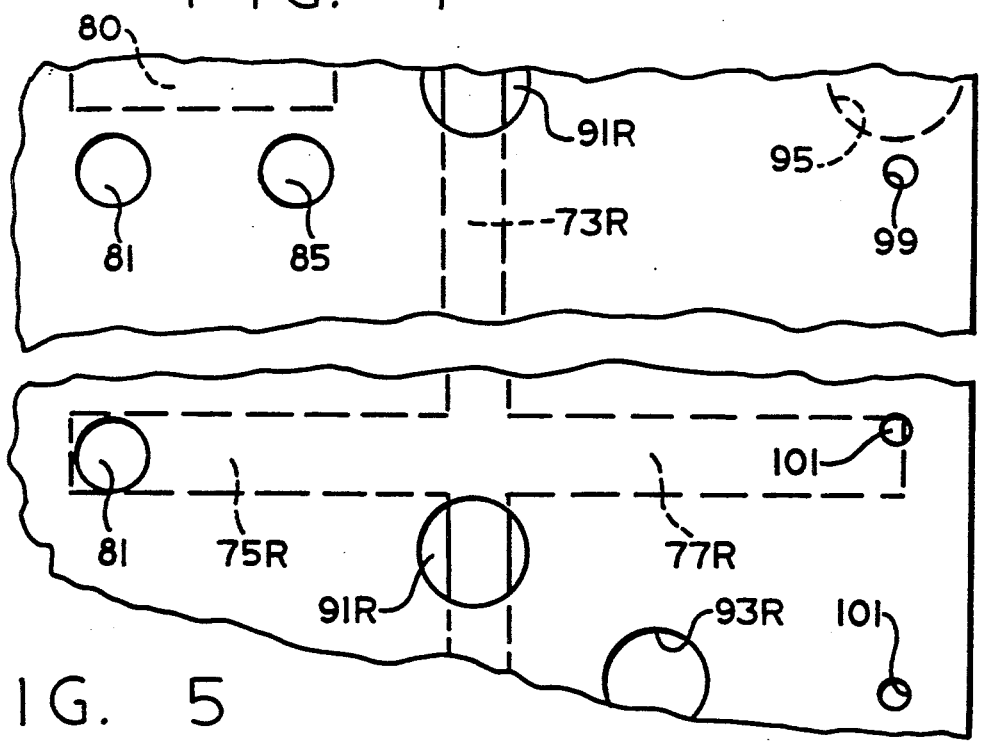
FIG. 4
FIG. 5

CONTROLLER WITH REDUCED TRAVEL LIMIT SLIP

BACKGROUND OF THE DISCLOSURE

The present invention relates to fluid controllers of the type used to control the flow of fluid from a source of pressurized fluid to a fluid pressure operated device, such as a steering cylinder.

A typical fluid controller of the type to which the present invention relates includes a housing, which defines various fluid ports, and further includes a fluid meter and valving, operable in response to an input, such as the rotation of the vehicle's steering wheel. The typical controller also includes an arrangement for imparting follow up movement to the valving in response to the flow of fluid to the fluid meter. The flow of fluid through the controller valving is proportional to the rate at which the steering wheel is rotated.

Fluid controllers of the type to which the present invention relates are illustrated and described further in U.S. Pat. Nos. Re 25,126, and 3,801,239, both of which are assigned to the assignee of the present invention, and incorporated herein by reference. The controller of U.S. Pat. No. 3,801,239 was developed in response to a problem which has been referred to as "travel limit slip". When the steering cylinder attached to the vehicle steered wheels reaches the end of its stroke, the steered wheels have reached the end of their travel. However, because of leakage out of the fluid meter of the controller, any continuing application of turning force to the steering wheel by the operator will result in the steering wheel continuing to turn, although at a slower rate. The rate of steering wheel rotation at this position (against the "stops") is known as the "travel limit slip rate" (TLSR) and is measured in revolutions per minute of the steering wheel.

U.S. Pat. No. 3,801,239 disclosed the concept of applying a hydraulic "brake" (also referred to as a "plugged star") to brake movement of a moveable member of a fluid meter, relative to the stationary member of the fluid meter. The hydraulic brake solution to the travel limit slip problem has not been put into extensive commercial use, partially because the use of the hydraulic brake in fluid controllers has resulted in a problem known as "feed-through". The conventional fluid controller has utilized a fluid meter comprising a gerotor gear set. A gerotor gear set includes an internally toothed gear (ring) having $N+1$ internal teeth, and an externally-toothed gear (star) having $N$ external teeth, wherein the star orbits and rotates within the ring. The interengagement of the internal and external teeth defines fluid volume chambers which, in the case of a fluid controller, contain either metered fluid or unmetered fluid. When "feed-through" occurs, there is leakage of metered fluid past the teeth of the star, into a chamber containing unmetered fluid, whenever an excessive pressure differential exists across the star, such as when steering against the stops. Any volume of fluid flowing out of the fluid controller in excess of that actually displaced by the meter, constitutes "feed-through", and is obviously undesirable because it results in movement of the steering cylinder, which does not result from any movement of the steering wheel by the vehicle operator. Such undesirable flow results in a phenomenon known as "wander", i.e. the vehicle "wanders" to either the left or the right, even when the steering wheel is not being rotated.

SUMMARY OF THE INVENTION

Accordingly, it is an object of the present invention to provide an approved fluid controller which incorporates an hydraulic brake for the fluid meter, to substantially eliminate the travel limit slip, but without introducing any substantial amount of "feed-through" into the steering system.

It is a more specific object of the present invention to provide an improved fluid controller having a brake for the fluid meter wherein the brake is pressurized when actuation of the brake is desired, but the brake is not pressurized during most of the period of normal steering operation when travel limit slip is not a problem.

The above and other objects of the invention are accomplished by the provision of an improved controller operable to control the flow of fluid from a source of pressurized fluid to a fluid pressure operated device. The controller is of the type including housing means defining an inlet port for connection to the source of pressurized fluid, a return port for connection to a reservoir, and first and second control fluid ports for connection to the fluid pressure operated device. Valve means is disposed in the housing means and defines a neutral position, a first operating position, and a maximum displacement position. The housing means and the valve means cooperate to define a main fluid path communicating between the inlet port and the first control fluid port and between the second control fluid port and the return port when the valve means is in the first operating position. A fluid actuated means imparts follow-up movement to the valve means proportional to the volume of fluid flow through the fluid actuated means, the fluid actuated means being disposed in series flow relationship in the main fluid path. The fluid actuated means comprises a stationary member and a moveable member operable to meter the volume of fluid flow through the main fluid path, and further comprising a braking means operable to apply a braking force to the moveable member, to brake movement of the moveable member relative to the stationary member. The housing means and the braking means cooperate to define a fluid chamber, the braking means being adapted to apply the braking force by the presence of pressurized fluid in the fluid chamber.

The improved controller is characterized by the housing means and the fluid actuated means cooperating to define fluid passage means communicating between the fluid chamber and the valve means. The valve means and the housing means cooperate to define drain passage means operable to provide relatively unrestricted fluid communication between the fluid passage means and the return port when the valve means is in the first operating position, and to substantially restrict the fluid communication between the fluid passage means and the return port when the valve means is approaching the maximum displacement position.

In accordance with a more limited aspect of the present invention, the improved controller is further characterized by the valve means and the housing means cooperating to define pressure passage means operable to provide fluid communication between the main fluid path and the fluid passage means when the valve means is in the maximum displacement position, to supply pressurized fluid in the fluid chamber defined by said braking means.

BRIEF DESCRIPTION OF THE DRAWINGS

FIG. 4 is a further enlarged, fragmentary, overlay view, similar to FIG. 3, with the valving in its operating position.

FIG. 5 is an enlarged, fragmentary, overlay view, similar to FIG. 4, with the valving in its maximum displacement position.

DESCRIPTION OF THE PREFERRED EMBODIMENT

Figure 1:
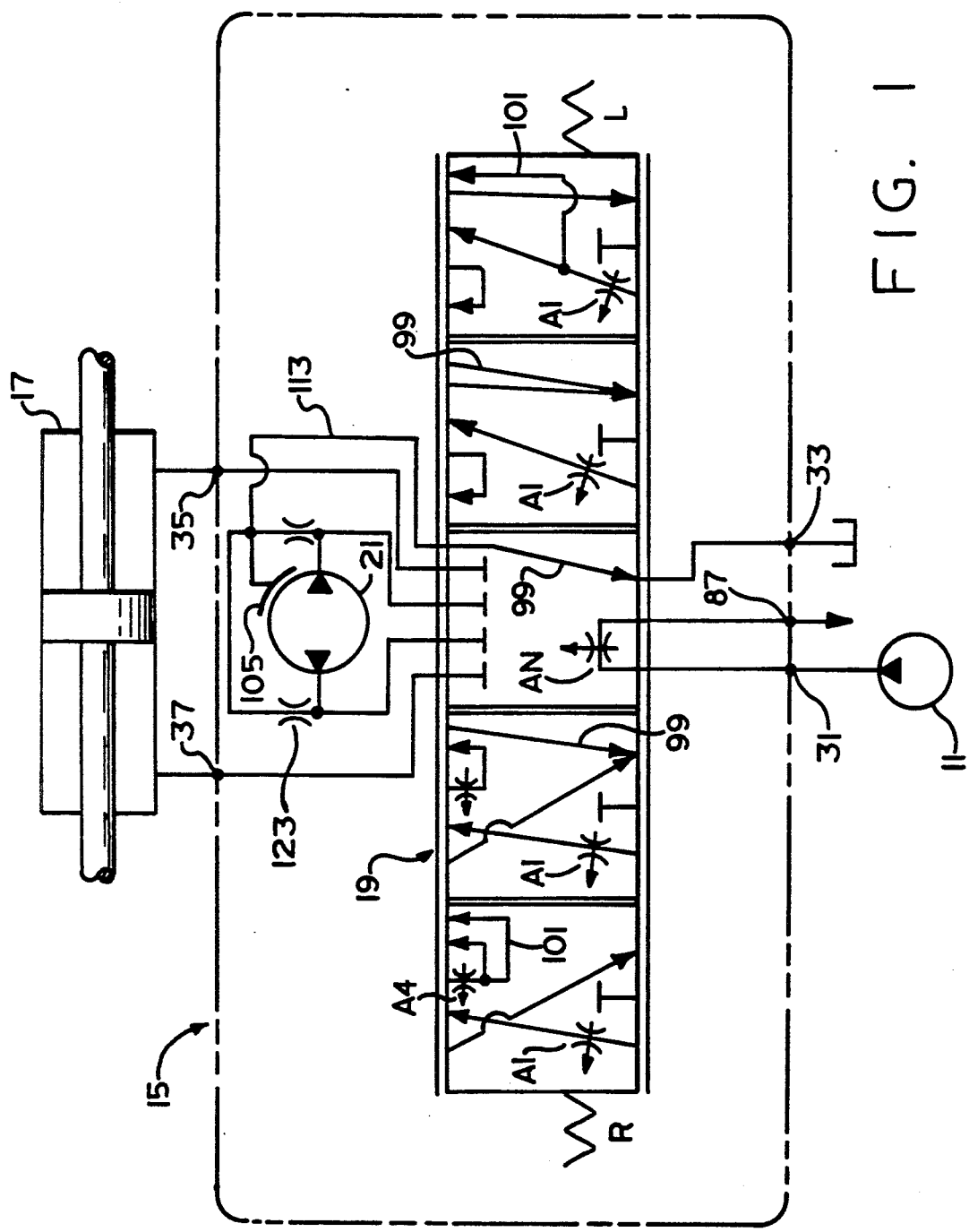
FIG. 1 is a hydraulic schematic of a fluid controller made in accordance with the present invention.

Referring now to the drawings, which are not intended to limit the invention, FIG. 1 is a hydraulic schematic of a fluid controller of the type which is typically used in a vehicle hydrostatic power steering system, also referred to as a full fluid-linked power steering system. The system includes a source of pressurized fluid, shown in FIG. 1 merely as a fluid pump 11, having its inlet connected to a system reservoir (not shown) in a manner well-known to those skilled in the art.

Referring still to FIG. 1, the steering system includes a fluid controller, generally designated 15, which controls the flow of fluid to a steering cylinder 17. The fluid controller 15, which will be described in greater detail in conjunction with FIG. 2, may be of the general type illustrated and described in U.S Pat. No. Re 25,126, and in the subject embodiment, is more specifically of the type illustrated and described in U.S. Pat. No. 4,109,679, both of which are assigned to the assignee of the present invention and incorporated herein by reference. Disposed within the fluid controller 15 is a valving arrangement, generally designated 19, which is movable from its neutral position shown in FIG. 1, to either a right turn position R, or a left turn position L. In the subject embodiment, both the right turn position R and the left turn position L of the valving 19 are illustrated as comprising two separate valving positions; in each case, the position adjacent the neutral position corresponds to a normal operating (steering) position, whereas the turn position further from neutral represents the maximum displacement position of the valving 19.

When the valving arrangement 19 is in either the right turn position R or the left turn position L, and in either the normal operating position or the maximum displacement position, the pressurized fluid from the pump 11 flows through the valving 19, then flows through a fluid meter 21, one function of which is to measure (meter) the proper amount of fluid to be communicated to the steering cylinder 17. As is well-known to those skilled in the art, the other function of the fluid meter 21 is to provide follow-up movement to the valving 19, such that the valving 19 is returned to its neutral position (as in FIG. 1) after the desired amount of fluid has been communicated to the steering cylinder 17. This follow-up movement is achieved by a means which will be described in connection with the detailed description of FIG. 2.

As may best be seen schematically in FIG. 1, the valving arrangement 19 defines a plurality of variable orifices, whenever the valving 19 is moved from its neutral position to any one of its operating positions (either normal or maximum displacement). These variable orifices will be described in greater detail subsequently, in conjunction with the description of FIGS. 3 through 5.

Fluid Controller 15

Figure 2:
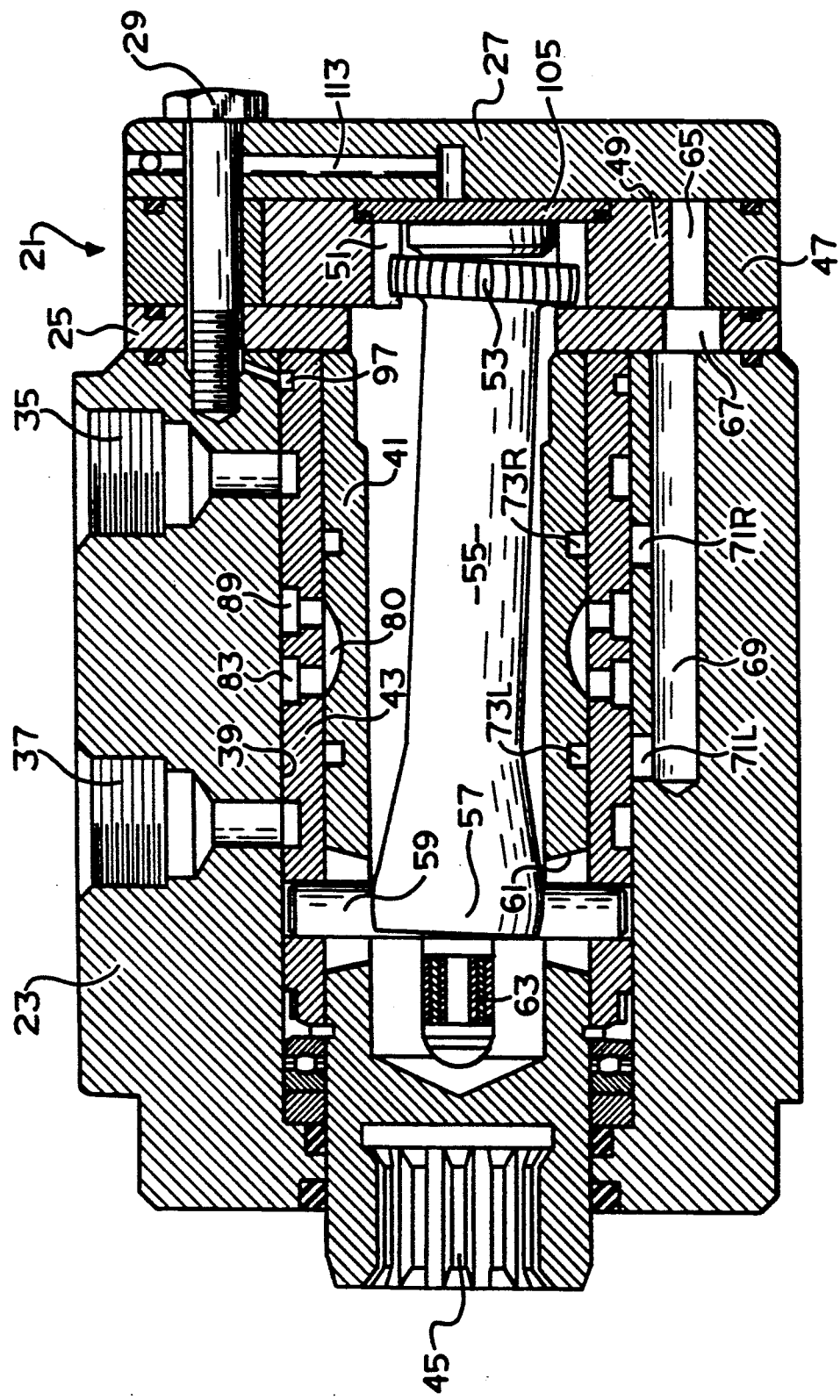
FIG. 2 is an axial cross-section of a fluid controller made in accordance with the present invention.

Referring now to FIG. 2, the construction of the controller 15 will be described in some detail. The fluid controller 15 comprises several sections, including a housing section 23, a port plate 25, a section comprising the fluid meter 21, and an end plate 27. These sections are held together in tight sealing engagement by means of a plurality of bolts 29 which are in threaded engagement with the housing section 23. The housing section 23 defines an inlet port 31 and a return port 33 (both of which are shown only in FIG. 1), and a pair of control fluid ports 35 and 37.

The housing section 23 further defines a valve bore 39, and disposed rotatably therein is the valving arrangement 19 shown schematically in FIG. 1. The valving 19 comprises a primary, rotatable valve member 41 ("spool"), and a cooperating, relatively rotatable follow-up valve member 43 ("sleeve"). As is well-known to those skilled in the art, the forward end (left end in FIG. 2) of the spool 41 includes a reduced diameter portion defining a set of internal splines 45 which provide for a direct mechanical connection between the spool 41 and a steering wheel (not shown). The spool 41 and sleeve 43 will be described in greater detail subsequently, in conjunction with FIGS. 3 through 5.

The fluid meter 21 may be of the type well-known in the art, and includes an internally-toothed stationary ring 47, and an externally-toothed moveable star 49. The star 49 defines a set of internal splines 51, and in splined engagement therewith is a set of external splines 53 formed at the rearward end of a drive shaft 55. The drive shaft 55 has a bifurcated forward end 57 permitting driving connection between the shaft 55 and the sleeve 43, by means of a pin 59 passing through a pair of pin openings 61 (see also FIG. 3) in the spool 41. Thus, pressurized fluid flowing through the valving 19 in response to rotation of the spool 41 flows through the fluid meter 21, causing orbital and rotational movement of the star 49 within the ring 47. Such movement of the star 49 causes follow-up movement of the sleeve 43 by means of the drive shaft 55 and pin 59, to maintain a particular relative displacement between the spool 41 and sleeve 43, proportional to the rate of rotation of the steering wheel. A plurality of leaf springs 63 extend through openings in the spool 41, biasing the sleeve 43 toward the neutral position, relative to the spool.

The toothed interaction of the star 49, orbiting and rotating within the ring 47, defines a plurality of expanding and contracting fluid volume chambers 65, and adjacent each chamber 65, the port plate 25 defines a fluid port 67. The housing section 23 defines a plurality of axial bores 69 (only one of which is shown in FIG. 2), each of which is in open communication with one of the fluid ports 67. The housing section 23 further defines a pair of radial bores 71L and 71R, providing communication between each of the axial bores 69 and the valve bore 39, for reasons to be described subsequently.

Valving Arrangement 19

Figure 3:
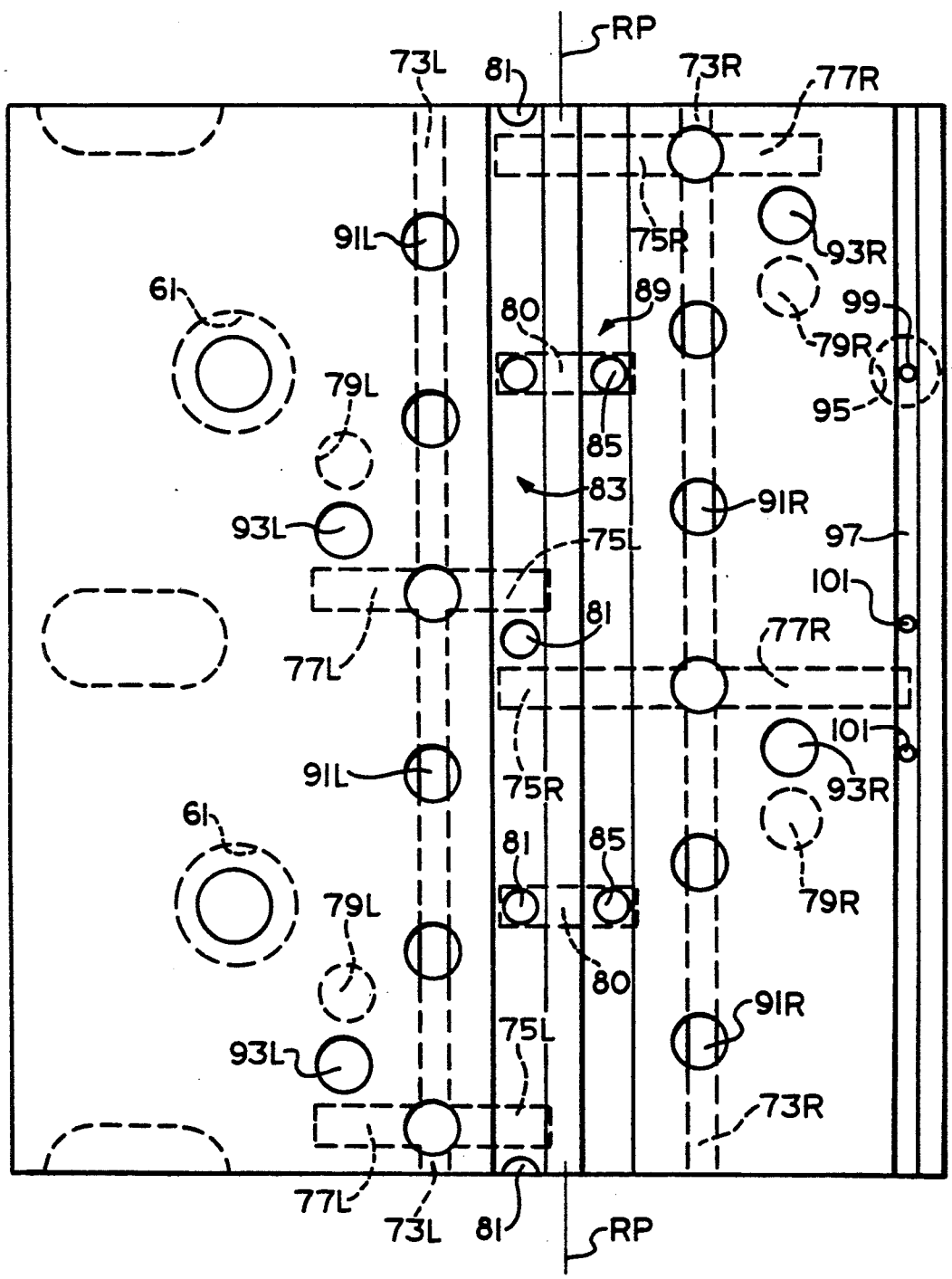
FIG. 3 is an overlay view of the valving of the fluid controller shown in FIGS. 1 and 2, but on a larger scale than in FIG. 2, and with the valving in its neutral position.

Referring now primarily to FIG. 3, the spool 41 and sleeve 43 will be described in detail. In connection with the subsequent description, it should be noted that many of the ports and passages are arranged symmetrically with respect to a central reference plane RP, and such elements will be described by a reference numeral followed by either an L or an R to indicate that the element is located on either the left side or the right side respectively, of the reference plane RP. On the other hand, certain of the elements do not have a corresponding element oppositely disposed about the reference plane RP, and will be referred to by use of a reference numeral alone. It should be understood that the overlay views of FIGS. 3 through 5 are intended to illustrate primarily the interface between the spool 41 and sleeve 43, and as a result, do not show all of the various features defined on the outer surface of the sleeve 43.

The spool 41 defines a pair of circumferential meter grooves 73L and 73R, which are approximately equally and oppositely disposed about the reference plan RP. In fluid communication with the meter groove 73L is a pair of pressure passages 75L, and in fluid communication with the meter groove 73R is a pair of pressure passages 75R. Also in fluid communication with the meter groove 73L is a pair of operating passages 77L, and in fluid communication with the meter groove 73R is a pair of operating passages 77R. In addition to the above-described grooves and passages which are formed on the outer surface of the spool 41, the spool defines a plurality of tank ports 79L and a pair of tank ports 79R. The tank ports 79L and 79R are in fluid communication with the interior of spool 41, so that low pressure, return fluid passes through the interior of the spool 41 and radially outward through the spring openings 61 which are in communication with the return port 33. Finally, the spool 41 defines a pair of axial slots 80, the function of which will be described subsequently.

The sleeve 43 defines a plurality of pressure ports 81, which are disposed to be in continuous fluid communication with the inlet port 31 by means of an annular groove 83 defined by the sleeve. Disposed to the right of the pressure ports 81 is a pair of neutral ports 85, which are disposed to be in continuous fluid communication with a high pressure carryover port 87 (see FIG. 1), by means of an annular groove 89 defined by the sleeve. Although the subject embodiment of the present invention includes closed-center valving, with high-pressure-carryover (power-beyond) capability, it should be apparent to those skilled in the art that the invention would be equally applicable to controllers having open-center or load sensing valving. Also, although the invention is illustrated and described in connection with one particular type of valving architecture, it is believed to be adaptable to any type of architecture.

Equally and oppositely disposed about the reference plane RP is a plurality of meter ports 91L, and a plurality of meter ports 91R, the meter ports 91L being in continuous fluid communication with the meter groove 73L, and the meter ports 91R being in continuous fluid communication with the meter groove 73R. At the same time, the meter ports 91L are disposed for commutating fluid communication with the radial bores 71L, while the meter ports 91R are disposed for commutating fluid communication with the radial bores 71R, in a manner well-known to those skilled in the art. Equally and oppositely disposed about the reference plane RP, is a pair of operating ports 93L, and a pair of operating ports 93R. With the valving arrangement 19 in the neutral position shown in FIGS. 1 and 3, each operating port 93L is approximately evenly disposed between an operating passage 77L and a tank port 79L. Similarly, each operating port 93R is approximately evenly spaced between an operating passage 77R and a tank port 79R.

Operation of Valving

It is believed that the basic operation of the fluid controller 15 and valving arrangement 19 described thus far should be readily apparent in view of the teachings of the above-incorporated patents. However, the operation of the controller and valving will be described briefly, partly to relate the structure illustrated in FIGS. 2 through 5 to the schematic of FIG. 1.

Referring still primarily to FIG. 3, when the valving 19 is in the neutral position (no rotation of the steering wheel), pressurized fluid is communicated from the inlet port 31 into the annular groove 83, and then through the two pressure ports 81 which are in open communication with the axial slots 80. Pressurized fluid flows through the slots 80, then through the neutral ports 85, into the annular groove 89, and from there to the high-pressure-carryover port 87. The cumulative overlap of the pressure ports 81, the neutral ports 85, and the axial slots 80 comprises a variable neutral orifice AN. With the valving 19 in the neutral position of FIG. 3, flow through the other pressure ports 81 is blocked by the outer surface of the spool 41, and there is no fluid flow through the rest of the valving 19 or the fluid meter 21.

When the steering wheel is rotated at a particular speed of rotation, the spool 41 is displaced, relative to the sleeve 43, by a particular rotational displacement. Thereafter, with continued rotation of the wheel, the fluid flowing through the fluid meter 21 results in follow-up movement of the sleeve 43, to maintain the particular rotational displacement.

Referring now to FIG. 4, in conjunction with FIG. 3, the spool 41 is displaced, relative to the sleeve 43 to select a left turn position L. With the spool 41 displaced as shown in FIG. 4, corresponding to the normal operating position illustrated schematically in FIG. 1, pressurized fluid is able to flow from two of the pressure ports 81 into the respective pressure passages 75R, the area of overlap therebetween cumulatively comprising a main variable flow control orifice A1. Pressurized fluid flows from each pressure passage 75R into the meter groove 73R, then radially outward through the meter ports 91R. This pressurized, unmetered fluid is then communicated to the fluid meter 21 through certain of the axial bores 69, then returns from the fluid meter 21 through the other of the axial bores 69 as pressurized, metered fluid. The metered fluid then flows through the meter ports 91L (see FIG. 3), into the meter groove 73L, and from there the metered fluid flows into the operating passages 77L, then flows through the respective operating ports 93L. The overlap between the passages 77L and the ports 93L cumulatively comprises a variable flow control orifice A4.

Fluid flowing through the operating ports 93L then flows to the control fluid port 37, then to the steering cylinder 17. Fluid which is exhausted from the cylinder 17 is communicated through the control fluid port 35 to the operating ports 93R, and then through the tank ports 79R, the area of overlap therebetween cumulatively comprising a variable flow control orifice A5. Return fluid flowing through the A5 orifice then flows to the return port 33 as was described previously. The flow path described above will be referred to hereinafter as the "main fluid path", and it should be noted by reference to FIGS. 1 and 3 that, if the spool is displaced, relative to the sleeve, in the opposite direction, so that the valving 19 is in the right turn position R, the flow through the valving will be in the "opposite" direction, and will flow to the control fluid port 35, then to the steering cylinder 17, returning to the control fluid port 37.

The structure and function described up to this point is generally well-known to those skilled in the art. Referring again primarily to FIG. 3, the improvement of the present invention will be described in detail. In the subject embodiment, one of the operating passages 77R extends further axially than the other, extending almost to the end of the spool 41. The spool 41 also defines a radial drain bore 95, which communicates with the interior of the spool 41 in the same manner, and for the same general purpose, as the tank ports 79L and 79R. The sleeve 43 defines an annular groove 97 and a drain port 99 communicating between the groove 97 and the drain bore 95, when the spool and sleeve are in either the neutral position of FIG. 3 or the normal operating position of FIG. 4. The spool 43 also defines a pair of pressure bores 101, which are equally spaced about the axially longer operating passage 77R, when the spool and sleeve are in the neutral position of FIG. 3.

Figure 6:
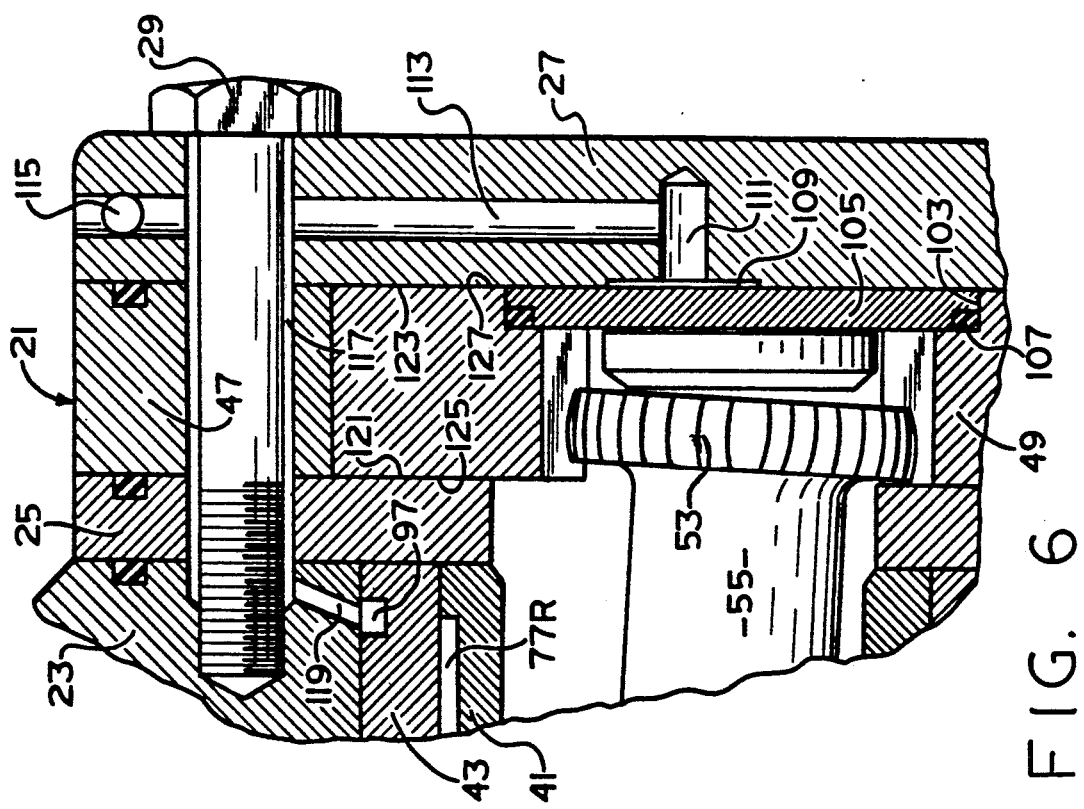
FIG. 6 is an enlarged, axial cross-section, similar to FIG. 2, illustrating one aspect of the present invention.

Referring now primarily to FIG. 6, there will be a description of additional structure associated with the present invention. The star 49 defines a recess 103 within which is disposed an annular plug member 105, being fitted with an annular sealing member 107. The rearward surface (right and in FIG. 6) of the plug member 105 and the adjacent surface of the end plate 27 cooperate to define a fluid chamber 109, the function of which will be described subsequently. The end plate 27 further defines a short axial fluid passage 111 and a radially-extending fluid passage 113. The fluid passage 113 is plugged adjacent the outer end thereof, by a plug ball 115.

The radial fluid passage 113 intersects an axially extending oversized bolt hole 117, through which the bolt 29 extends. In the subject embodiment, only one of the bolts 29 is provided with an oversized bolt hole 117, the function of which will be described subsequently. All of the remaining bolts 29 are provided with normal, close fitting bolt holes, as is well-known to those skilled in the art. The oversized bolt hole 117 extends through the end plate 27, through the ring 47, through the port plate 25, and into the housing section 23 a short distance. At the forward end (left end in FIG. 6) of the bolt hole 117, the housing section 23 defines an angled passage 119 which provides continuous fluid communication between the bolt hole 117 (i.e., the chamber surrounding the bolt 29), and the annular groove 97 defined by the sleeve 43.

Referring still to FIG. 6, it is typical in a gerotor gear set of the type which comprises the fluid meter 21 for the star 49 to be shorter, in the axial direction, than the ring 47, to permit orbital and rotational movement of the star 49, relative to the ring 47, without excessive binding. The port plate 25 defines an end wall 121 on the side adjacent the star 49, and the end plate 27 defines an end wall 123 adjacent the star 49. The star 49 defines a pair of end surfaces 125 and 127, disposed adjacent the end walls 121 and 123, respectively. As is well-known to those skilled in the art, during operation of the fluid meter, a certain amount of pressurized fluid can leak from certain of the volume chambers 65, between adjacent surfaces 121 and 125, to the interior or "case drain" region of the controller. As was described previously, the interior of the controller is in relatively unrestricted fluid communication with the return port 33. Similarly, pressurized fluid can leak from certain of the volume chambers 65, and flow between the adjacent surfaces 123 and 127. Unlike the fluid leakage occurring on the forward end of the star 49, the fluid leaking between the end wall 123 and end surface 127 flows radially inwardly until it enters the fluid chamber 109, where it exerts a biasing force on the plug member 105. This leakage path is shown schematically in FIG. 1, and bears the reference numeral "123", because the path is along the end wall 123 of the star 49. If the fluid in the chamber 109 is pressurized, the result will be a biasing force exerted on the plug member 105, and on the star 49, tending to bias the star forwardly (to the left in FIG. 6). In the subject embodiment, the net biasing force on the star 49 is approximately equal to the area of the plug 105 multiplied by the pressure in the chamber 109. Thus, the biasing or braking force applied to the star 49 has a limit, and even with the present invention, it may still be possible to have travel limit slip, if sufficient torque is applied to the steering wheel.

A further result is that, when the star 49 is biased forwardly, the end surface 125 is biased into frictional, braking engagement with the end wall 121, as is generally described in above-incorporated U.S. Pat. No 3,801,239. Although the invention is illustrated as including the plug member 105, it should be understood that the plug and the star could be formed integrally, or the plug could even be eliminated altogether, as long as there is some way to define the fluid chamber 109.

As was mentioned in the background of the specification, such braking arrangements have not been used commercially to any great extent because it was found that the resulting frictional engagement between the star 49 and the port plate 25 would frequently result in "feed-through", which could, under certain conditions, result in wander. It is an important aspect of the present invention to provide such a braking arrangement, thus substantially reducing the travel limit slip rate, while at the same time, overcoming the prior art problem of feed-through.

Referring now primarily to FIGS. 3, 4 and 6, during normal steering, with the valving 19 in its normal operating position, travel limit slip is not a concern, and there is no need for braking of the gerotor star. Therefore, during normal steering operations, the drain port 99 of the sleeve 43 may be in open, relatively unrestricted communication with the drain bore 95 defined by the spool 41. As a result, reservoir pressure (approximately 0 psi) is present also in the angled passage 119, the bolt hole 117, the fluid passages 113 and 111 and the fluid chamber 109. With no substantial pressure in the fluid chamber 109, the star 49 is free to seek its normal, centered position between the adjacent end walls 121 and 123. The above-described operating condition is illustrated schematically in FIG. 1, in the central, neutral position as well as in the adjacent right turn and left turn, normal operating positions, in which the fluid passage 113 is illustrated as being drained to the system reservoir by means of the drain port 99 in the valving.

Referring now primarily to FIGS. 1, 5 and 6, as the valving 19 approaches its maximum displacement position, with the valving in a left turn position, the one longer operating passage 77R begins to communicate with one of the adjacent pressure bores 101, such that metered, pressurized fluid downstream of the A1 orifice is communicated into the pressure bore 101, and into the annular groove 97. At the same time, the unrestricted communication between the drain port 99 and the drain bore 95 is being terminated, thereby making it possible to build pressure in the annular groove 97. This pressure in the groove 97 is then communicated through the oversized bolt hole 117, then through the fluid passages 113 and 111 into the fluid chamber 109. Therefore, with the displacement of the valving progressively increasing, the pressure in the fluid chamber 109 will increase substantially, just as the valving approaches its maximum displacement position, thus pressurizing the plug member 105 as was described previously. This operating condition is illustrated schematically in FIG. 1, in which the pressure bore 101 is shown communicating fluid from downstream of the A1 orifice to the fluid passage 113, in the maximum displacement position for a left turn position L.

Referring now also to FIG. 3, it may be seen that when the steering wheel is rotated to effect a right turn position R, the various grooves and passages defined by the spool 41 move upward in FIG. 3, so that the pressure ports 81 begin to communicate with the pressure passages 75L, and in turn, with the operating passages 77L. When the maximum displacement position is achieved for a right turn position R, the longer operating passage 77R is now in communication with the other pressure bore 101, to communicate pressurized, unmetered fluid through the pressure bore 101 and eventually to the fluid chamber 109, in the same manner as was described previously, for a left turn. The primary difference in the operation for the right turn is simply that the pressure bore 101 is in communication with the main fluid path at a location downstream of the A4 orifice, rather than at a location downstream of the A1 orifice, as was the case for a left turn.

Figure 7:
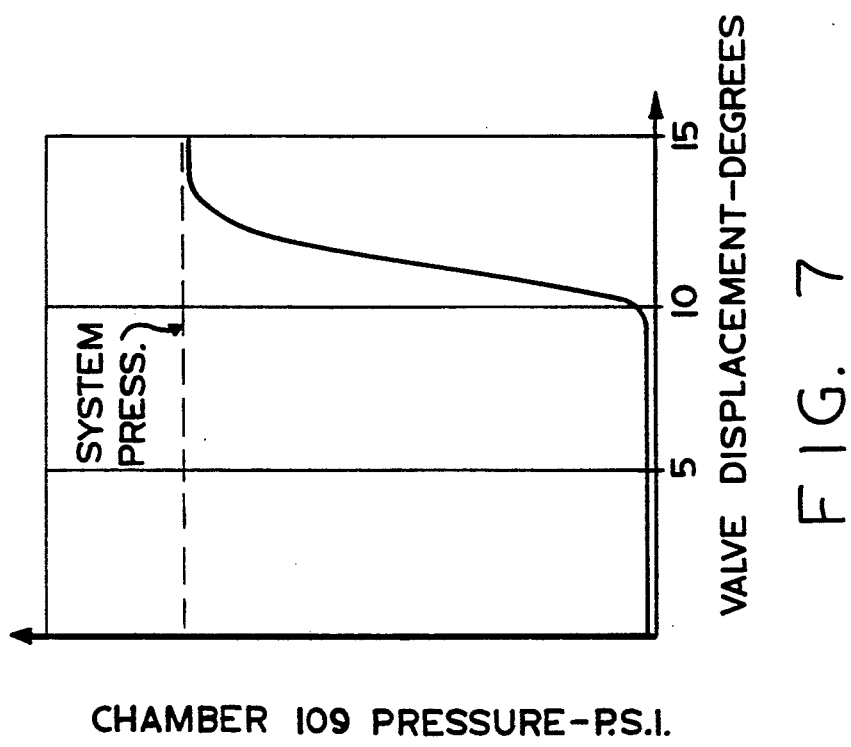
FIG. 7 is a graph of brake chamber pressure (in psi) versus valve displacement (in degrees).

Referring now to FIG. 7, there is a graph of the pressure in the fluid chamber 109 as a function of the displacement of the valving 19, showing that the pressure is substantially 0 until the valving displacement is about ten degrees (the position illustrated in FIG. 4), at which point the orifice formed between the drain bore 95 and drain bore 99 is starting to close. At about twelve degrees valve displacement, the one pressure bore 101 begins to communicate with its operating passage 77R. As the valving approaches its maximum displacement position (fifteen degrees, as illustrated in FIG. 5), the pressure in the chamber 109 rises rapidly, approaching System Pressure (i.e., the pressure in the main fluid path).

It should be understood that only the ability to drain the fluid chamber 109 is an essential feature of the present invention. The ability to pressurize the chamber 109 at maximum displacement is desirable, but is not essential, especially if leakage fluid from the meter 21 is sufficient to bias the star 49 as soon as the drain is closed, or if there is insufficient room in the valving for the additional ports needed to communicate pressure from the main fluid path to the chamber 109.

In the subject embodiment, the valving which controls the draining and pressurization of the chamber 109 is integral with the spool 41 and sleeve 43, but it would be within the scope of the invention to control the pressure in the chamber 109 by means of a valve means which is separate from the main controller valving. However, if separate valving were used, it would be desirable to have it function in association with the controller valving, at least in regard to the timing.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

We claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position (FIG. 3), a first operating position (FIG. 4), and a maximum displacement position (FIG. 5); said housing means and said valve means cooperating to define a main fluid path communicating between said inlet port and said first control fluid port, and between said second control fluid port and said return port when said valve means is in said first operating position; fluid actuated means for imparting follow-up movement to said valve means proportional to the volume of fluid flow through said fluid actuated means, said fluid actuated means being disposed in series flow relationship in said main fluid path; said fluid actuated means comprising a stationary member and a movable member operable to meter the volume of fluid flow through said main fluid path, and further comprising a plug member operable to apply a braking force to said movable member, to brake movement of said movable member relative to said stationary member, said housing means and said plug member cooperating to define a fluid chamber, said plug member being adapted to apply said braking force by the presence of pressurized fluid in said fluid chamber; characterized by:

(a) said housing means and said fluid actuated means cooperating to define fluid passage means communicating between said fluid chamber and said valve means;

(b) said valve means and said housing means cooperating to define drain passage means operable to provide relatively unrestricted fluid communication between said fluid passage means and said return port when said valve means is in said first operating position (FIG. 4), and to substantially restrict said fluid communication between said fluid passage means and said return port when said valve means is approaching said maximum displacement position (FIG. 5).

2. A controller as claimed in claim 1 characterized by said valve means and said housing means cooperating to define pressure passage means operable to provide fluid communication between said main fluid path and said fluid passage means when said valve means is in said maximum displacement position (FIG. 5).

3. A controller as claimed in claim 1 characterized by said valve means comprising a primary, rotatable valve member and a cooperating, relatively rotatable follow-up valve member, said primary and follow-up valve members defining said neutral position (FIG. 3), said first operating position (FIG. 4), and said maximum displacement position (FIG. 5) relative to each other.

4. A controller as claimed in claim 3 characterized by said follow-up valve member and said housing means cooperating to define an annular drain groove, in fluid communication with said fluid passage means, and said primary and follow-up valve members cooperating to define a variable drain orifice disposed in series flow relationship between said annular drain groove and said return port, said annular drain groove and said variable drain orifice comprising said drain passage means.

5. A controller as claimed in claim 4 characterized by said variable drain orifice having a maximum flow area when said valve means is in said neutral position (FIG. 3), and a decreasing flow area when said valve means moves from said first operating position (FIG. 4) toward said maximum displacement position (FIG. 5).

6. A controller as claimed in claim 5 characterized by said variable drain orifice having a substantially zero flow area when said valve means is in said maximum displacement position (FIG. 5).

7. A controller as claimed in claim 6 characterized by said follow-up valve member defining a plurality of pressure ports in continuous fluid communication with said inlet port, and a plurality of operating ports in continuous fluid communication with said first control fluid port; said primary valve member defining slot means operable to provide fluid communication between said pressure ports and said operating ports when said valve means in said first operating position (FIG. 4).

8. A controller as claimed in claim 7 characterized by said primary and follow-up valve members cooperating to define a variable pressure orifice disposed in series flow relationship between said slot means and said annular drain groove, said variable pressure orifice having a substantially zero flow area when said valve means is in said neutral position (FIG. 3), and an increasing flow area as said valve means approaches said maximum displacement position (FIG. 5).

9. A controller as claimed in claim 1 characterized by said movable member comprising an externally-toothed member having substantially parallel end surfaces; and said stationary member comprising an internally-toothed member, said housing means including parallel end walls, said externally-toothed member being eccentrically disposed within said internally-toothed member for relative orbital and rotational movement therein, the teeth of said members interengaging to define expanding and contracting fluid volume chambers during said relative orbital and rotational movement.

10. A controller as claimed in claim 9 characterized by said plug member being disposed in engagement with an end surface of said externally-toothed member, and operable in response to the presence of pressurized fluid in said fluid chamber to bias said externally-toothed member into frictional engagement with one of said end walls of said housing means.

11. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position (FIG. 3), a first operating position (FIG. 4), and a maximum displacement position (FIG. 5); said housing means and said valve means cooperating to define a main fluid path communicating between said inlet port and said first control fluid port, and between said second control fluid port and said return port when said valve means is in said first operating position; fluid actuated means for imparting follow-up movement to said valve means proportional to the volume of fluid flow through said fluid actuated means, said fluid actuated means being disposed in series flow relationship in said main fluid path; said fluid actuated means comprising an internally-toothed member and an externally-toothed member eccentrically disposed within said internally-toothed member, and further comprising a plug member operable to apply a braking force to at least one of said internally-toothed and externally-toothed members, said housing means and said plug member cooperating to define a fluid chamber, said plug member being adapted to apply said braking force by the presence of pressurized fluid in said fluid chamber; characterized by:

(a) said housing means and said fluid actuated means cooperating to define fluid passage means communicating with said fluid chamber;

(b) brake valve means associated with said housing means and cooperating therewith to define drain passage means operable to provide relatively unrestricted fluid communication between said fluid passage means and said return port when said controller valve means is in said first operating position (FIG. 4), and to substantially restrict said fluid communication between said fluid passage means and said return port when said controller valve means is in said maximum displacement position (FIG. 5).

12. A controller as claimed in claim 11 characterized by said brake valve means being integral with said controller valve means.

13. A controller as claimed in claim 11 characterized by said brake valve means and said housing means cooperating to define pressure passage means operable to provide fluid communication between said main fluid path and said fluid passage means when said controller valve means is in said maximum displacement position (FIG. 5), said pressure passage means defining a variable pressure orifice having a substantially zero flow area when said controller valve means is in said first operating position (FIG. 4).

* * * * *